United States Patent
Simonson et al.

(10) Patent No.: US 6,306,357 B1
(45) Date of Patent: Oct. 23, 2001

(54) PROCESS AND APPARATUS FOR ABSORBING HYDROGEN SULPHIDE

(75) Inventors: Erik Simonson, Växjö ; Mats Wallin, Lund; Sune Bengtsson, Växjö ; Erik Dahlqvist, Västerås, all of (SE)

(73) Assignee: ABB Flakt AB, Stockholm (SE)

( * ) Notice: Subject to any disclaimer, the term of this patent is extended or adjusted under 35 U.S.C. 154(b) by 842 days.

(21) Appl. No.: 08/505,338

(22) PCT Filed: Jan. 18, 1994

(86) PCT No.: PCT/SE94/00030

§ 371 Date: Oct. 25, 1995

§ 102(e) Date: Oct. 25, 1995

(87) PCT Pub. No.: WO94/19091

PCT Pub. Date: Sep. 1, 1994

(51) Int. Cl.[7] .............................. B01D 53/52; B01J 19/00
(52) U.S. Cl. ................ 423/232; 423/220; 162/51; 422/169; 422/170; 422/171; 422/181
(58) Field of Search .................. 423/220, 232, 423/576.4; 422/169, 193, 170, 171, 181; 162/30.11, 51

(56) References Cited

U.S. PATENT DOCUMENTS

| | | | | |
|---|---|---|---|---|
| 2,878,107 | * | 3/1959 | Ruth | 23/283 |
| 3,431,165 | * | 3/1969 | Buxton, Jr. | 162/30 |
| 3,532,595 | * | 10/1970 | Arnesjo et al. | 162/47 |

(List continued on next page.)

FOREIGN PATENT DOCUMENTS

| | | | |
|---|---|---|---|
| 0459962 | 5/1991 | (EP) . | |
| 62-266119 | * 11/1987 | (JP) | 423/232 |
| 319078 | 12/1969 | (SE) . | |
| 448173 | 1/1987 | (SE) . | |
| 93/25751 | 12/1993 | (WO) . | |

OTHER PUBLICATIONS

"Chemical Engineers' Handbook" by Perry et al,; 5th Edition McGraw Hill Book Co. 1973 pp. 18–84 to 18–87.*
E. Bendall et al "AIChE Journal" (vol. 29, No. 1) pp. 66–72, Jan. 1983 "Selective Absorption of $H_2S$ . . . ".

(List continued on next page.)

Primary Examiner—Steven P. Griffin
Assistant Examiner—Timothy C Vanoy
(74) Attorney, Agent, or Firm—Birch, Stewart, Kolasch & Birch, LLP

(57) ABSTRACT

A process and an apparatus in black-liquor evaporation for the selective removal, by liquid absorption, of hydrogen sulphide from the generated gas (3) containing hydrogen sulphide as well as carbon dioxide, an disclosed. In the process, the gas is counter-currently brought into multistage contact, preferably comprising three stages (6, 7, 8), with circulating carbonate-containing alkaline solutions, preferably sodium carbonate solutions (25), the pH of which is adjusted during the absorption to about 9–12 by the addition of a hydroxide, preferably a sodium hydroxide solution (26, 27, 28). It is preferred that the gas flow is turbulent and the liquid flow is laminar when contacted with one another. The apparatus comprises a container (1) having a gas inlet (2), a gas outlet (4), and a packing (9) arranged in several successive stages (6, 7, 8). The apparatus has means (25) for supplying a carbonate-containing solution to the last stage and through this stage countercurrently to the gas, and for recycling the solution across this stage; conduits (29, 30) arranged between the stages for supplying a partial flow of the solution from one stage to a preceding stage; means (26, 27, 28) for supplying a hydroxide to the carbonate-containing solution in at least one of the stages (6, 7, 8); and an outlet conduit (31) from the first stage, as seen in the feed direction of the gas, for discharging a sulphide-containing liquid.

11 Claims, 1 Drawing Sheet

U.S. PATENT DOCUMENTS

| | | | |
|---|---|---|---|
| 3,554,859 | | 1/1971 | Murray ................................. 162/30 |
| 4,431,617 | * | 2/1984 | Farin ................................... 423/232 |
| 4,585,630 | * | 4/1986 | Kent et al. .......................... 423/234 |
| 4,808,264 | * | 2/1989 | Kignell ............................... 162/30.1 |
| 4,872,950 | | 10/1989 | Andersson et al. .................... 162/15 |
| 5,450,892 | * | 9/1995 | Gautreaux, Jr. ....................... 162/16 |
| 5,556,605 | * | 9/1996 | Stigsson ............................... 423/220 |
| 6,139,807 | * | 10/2000 | Risse et al. .......................... 422/171 |

OTHER PUBLICATIONS

"Use of SCA–Billerud Recovery Process for Sodium Base Horntvedt et al. Liquors" Paper Trade Journal/Apr. 22, 1974—pp. 32–34.

"The Selective Absorption of Hydrogen Sulphide from Stack Gas" —Technical Paper T499, pp. 69–74, Dec. 5, 1969 Bendall et al.

* cited by examiner

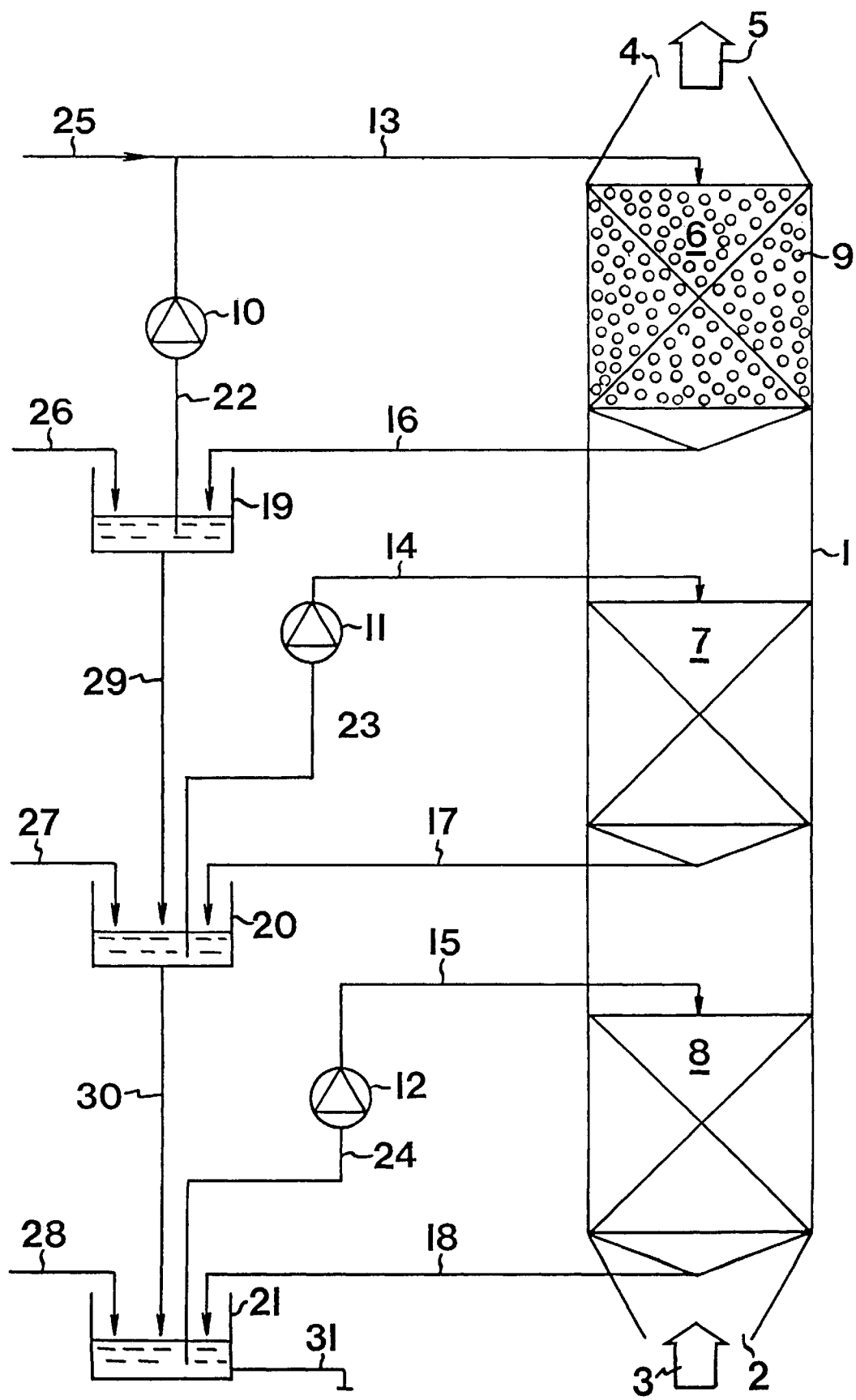

PROCESS AND APPARATUS FOR ABSORBING HYDROGEN SULPHIDE

BACKGROUND OF THE INVENTION

1. Field of the Invention

This invention relates to a process and an apparatus for absorbing hydrogen sulphide, more specifically a process and an apparatus in black-liquor evaporation for the selective removal, by liquid absorption, of hydrogen sulphide from a gas containing hydrogen sulphide as well as carbon dioxide.

2. Description of Conventional Art

Hydrogen sulphide is absorbed chiefly in the form of hydrogen-sulphide ions ($HS^-$) but also in the form of sulphide ions ($S^{2-}$). In the following, the total content of these ions will be collectively referred to as the "total sulphide content" or, more briefly, as the "sulphide content".

It is well-known that hydrogen sulphide can be removed from hydrogen-sulphide-containing gases by being absorbed in an alkaline aqueous solution, such as sodium hydroxide, or by using ethanolamine, such as monoethanolamine and diethanolamine. The absorption method may, for instance, be used for producing hydrogen sulphide in pure form, and optionally further processing to sulphur in a Claus process. If the gas contains carbon dioxide in addition to hydrogen sulphide, the carbon dioxide will also be absorbed in the alkaline solution. Carbon dioxide has approximately the same solubility in water as hydrogen sulphide, and the carbon dioxide will therefore compete with the hydrogen sulphide for being absorbed in the solution. Hydrogen sulphide and carbon dioxide are absorbed in an alkaline aqueous solution of e.g. sodium hydroxide in accordance with the formulae below.

  (1)

  (2)

  (3)

  (4)

The selectivity for hydrogen sulphide, i.e. the ratio of mole of absorbed hydrogen sulphide to mole of absorbed (hydrogen sulphide+carbon dioxide), is directly proportional to the hydrogen sulphide and carbon dioxide contents of the gas. Thus, the competition on the part of carbon dioxide is especially pronounced when the gas contains more carbon dioxide than hydrogen sulphide, as is mostly the case in actual practice. If a gas contains, say, 1% by volume of hydrogen sulphide and 10% by volume of carbon dioxide and efforts are made to absorb the hydrogen sulphide in a sodium hydroxide solution, the selectivity for hydrogen sulphide is merely 10%, i.e. 90% of the gas absorbed is made up of carbon dioxide, which means that as much as 90% of the sodium hydroxide is spent in absorbing carbon dioxide.

In an effort to remedy the above inconvenience in the absorption of hydrogen sulphide from gases containing hydrogen sulphide as well as carbon dioxide, methods for selective absorption of hydrogen sulphide have been developed. For instance, efforts have been made to selectively absorb hydrogen sulphide in solutions of strong oxidising agents, such as potassium permanganate, sodium dichromate or ferric salts. In other selective methods, use is made of alkaline solutions, such as sodium carbonate or potassium carbonate solutions, the operational conditions being carefully adjusted in the absorption. More detailed information about this prior-art technique is found in an article by C. Oloman, F. E. Murray and J. B. Risk, entitled "The Selective Absorption of Hydrogen Sulphide from Stack Gas", Pulp and Paper Magazine of Canada, Dec. 5, 1969, p. 69 ff, as well in an article by E. Bendall, R. C. Aiken and F. Mandas, entitled "Selective Absorption of $H_2S$ from Larger Quantities of $CO_2$ by Absorption and Reaction in Fine Sprays", AICHE Journal (Vol. 29, No. 1), January 1983, p. 66 ff.

An instance of the prior art is described in U.S. Pat. No. 3,554,859, which relates to a method for recovering sulphur from furnace gases generated in the combustion of e.g. black liquor. The combustion gases, which contain hydrogen sulphide and carbon dioxide, are contacted with a gas containing molecular oxygen and with an aqueous alkaline solution containing sodium ions, e.g. in the form of sodium hydroxide and sodium carbonate or sodium carbonate and sodium hydrogencarbonate. Thus, hydrogen sulphide is absorbed from the gas and oxidised to thiosulphate. The absorption is rendered even more effective by an addition of ferric oxide, the sulphide concentration of the solution being thus maintained at a very low level, i.e. the sulphide content of the solution should be minimised.

By using a carbonate solution, such as a sodium carbonate solution, instead of a hydroxide solution, such as a sodium hydroxide solution, the selectivity for the absorption of hydrogen sulphide can be augmented to about 30–50%. The reactions taking place during such absorption can generally be rendered as follows.

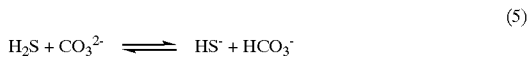  (5)

  (6)

When the absorption solution is a carbonate solution, the hydrogen sulphide is absorbed almost instantaneously, whereas the carbon dioxide reacts only slowly with the carbonate ions to form hydrogen carbonate ions. Owing to the high content of hydrogen carbonate generated when using a carbonate solution as absorption medium, there is the additional advantage of a "counterpressure" (equilibrium pressure) to the absorption of carbon dioxide, as appears from the equilibrium formula (6) above.

A problem that arises when using a carbonate solution as absorption medium is that only a relatively low sulphide content can be achieved in the solution, owing to the reduction of the absorption capacity caused by the formation of hydrogen carbonate ions. Thus, it is extremely difficult to attain sulphide contents exceeding about 0.30 mole/l. As a result, prior-art methods for selective absorption of hydrogen sulphide by means of an absorption medium in the form of a carbonate solution have not met with much success, despite the great demand for such a method in the many fields where hydrogen-sulphide-containing and carbon-dioxide-containing gases are generated. Examples of such fields of application are petroleum refinement, coal-gas production and, in particular, the combustion of black liquor carried out in the sulphate pulp industry.

When recovering chemicals in the sulphate industry in accordance with the conventional Tomlinson process, the black liquor is burnt in a soda recovery unit, resulting in the generation of steam and the formation of a melt chiefly consisting of sodium carbonate and sodium sulphide. The melt is then dissolved in water and causticised, so that the sodium carbonate is converted to sodium hydroxide and white liquor is obtained, which may then again be used for digesting wood. For many reasons, including the risk of an explosion when a tube in the soda recovery unit bursts, efforts have in recent years been made to develop new processes for the combustion of black liquor, in which the black liquor is pyrolysed under reducing conditions and in which no melt is formed.

Such processes can be collectively referred to as "black-liquor evaporation", and one instance thereof is the so-called SCA-Billerud process (E. Horntvedt and J. Gomy, Paper Trade Journal 158 (1974):16, pp 32–34). In this process, the black liquor is pyrolysed in a reactor under such temperature conditions that dust, which chiefly consists of sodium carbonate and carbon, and a combustible gas, which inter alia contains sulphur compounds, are formed. Another instance of black-liquor evaporation is given in U.S. Pat. No. 4,872,950, which relates to a method for thermal decomposition of black liquor with concurrent supply of oxygen in an amount short of the stoichiometrically required amount, at a pressure above 10 bar, and at such a temperature that no melt is formed. The evaporation results in the formation of a solid phase, which chiefly consists of sodium carbonate, and a gaseous phase, which chiefly consists of hydrogen sulphide, carbon monoxide, carbon dioxide, hydrogen, water vapour, and methane.

EP 459,962 is concerned with the cleaning of process gas in black-liquor evaporation. In the cleaning, sulphur compounds and sodium compounds are removed from the gas by the contact with alkaline solutions containing hydrogen sulphide ions and hydroxide ions. The cleaning involves at least two stages. In the first stage, the gas is passed through a venturi nozzle along with an alkaline solution, so that melted aerosol drops of black liquor in the gas are absorbed by the solution. Then, the gas is contacted with a solution containing hydroxide ions and hydrogen sulphide ions in a molar ratio exceeding 4:1. The high molar ratio of hydroxide ions to sulphide ions results in the absorption solution having a low sulphide concentration. The alkaline solutions used in the absorption, such as white liquor or wash liquor, have high pH values of about 13–14, resulting in poor selectivity for the absorption of hydrogen sulphide. Furthermore, the absorption solution employed has a low carbonate content, and it is specifically indicated that green liquor, which has a high carbonate content, cannot be used as washing solution.

In order to be able to recover the chemicals used in black-liquor evaporation, i.e. the evaporation of black liquor by combustion in a reducing atmosphere, and produce from these chemicals white liquor to be used in the manufacture of pulp, it is necessary that the hydrogen sulphide can be removed from the generated gas. Since the gas also contains carbon dioxide, the latter will compete with the hydrogen sulphide in the liquid absorption, and since the gas has a low content of hydrogen sulphide (about 0.5–2%) while the carbon dioxide content is some 20 times higher (about 10–20%), conventional liquid absorption results in unsatisfactory recovery of hydrogen sulphide.

SUMMARY OF THE INVENTION

Thus, there is a demand for a method of separating, from a gas generated in black-liquor evaporation and containing hydrogen sulphide as well as carbon dioxide, the hydrogen sulphide at a high degree of separation and a high degree of selectivity, as well as absorbing the hydrogen sulphide in a liquid such that a high sulphide content is obtained therein.

According to the invention, it has been found that countercurrent and multistage absorption, which uses a carbonate-containing alkaline solution as absorption medium and during which the pH of the solution is adjusted to about 9–12 by the addition of a hydroxide and not by the addition of fresh carbonate, involves a high degree of separation of hydrogen sulphide as well as a high selectivity for hydrogen sulphide. Thus, the invention enables a selectivity for the absorption of hydrogen sulphide of 60–70%, as well as a degree of separation of hydrogen sulphide of about 90–99%. According to the invention, the total sulphide content of the outgoing absorption solution is high, i.e. above about 0.30 mole/l, preferably above about 0.47 mole/l, and usually is in the range of about 0.30–1.30 mole/l, preferably in the range of about 0.47–1.1 mole/l, and most preferred in the range of about 0.65–1.0 mole/l. This solution can be utilised for producing white liquor in the manufacture of sulphate pulp.

To be more specific, the invention provides a process which is of the type mentioned by way of introduction and in which the gas is countercurrently brought into multistage contact with circulating carbonate-containing alkaline solutions, the pH of which is adjusted during the absorption to about 9–12 by the addition of a hydroxide, such that the hydrogen sulphide is absorbed to a total sulphide content exceeding about 0.30 mole/l in the outgoing solution in contact with the incoming gas.

The invention further provides an apparatus which is of the type mentioned by way of introduction and which is characterised in that the apparatus comprises a container having a gas inlet and a gas outlet, that the container contains a packing arranged in a number of successive stages, that the apparatus has means for supplying a carbonate-containing solution to the last stage, as seen in the feed direction of the gas, that each stage has means for supplying the carbonate-containing solution through the stage countercurrently to the gas and for recycling the solution across the stage, that the apparatus has conduits arranged between the stages for supplying a partial flow of the solution from one stage to a preceding stage, as seen in the feed direction of the gas, and that the apparatus has means for supplying a hydroxide to the carbonate-containing solution in at least one of the stages in order to adjust the pH of the solution to about 9–12, as well as an outlet conduit from the first stage, as seen in the feed direction of the gas, for discharging liquid having a total sulphide content exceeding 0.30 mole/l.

BRIEF DESCRIPTION OF THE DRAWINGS

The sole FIGURE is a representative diagram of an embodiment of the apparatus of the present invention.

DESCRIPTION OF THE PREFERRED EMBODIMENTS

Further distinctive features of the invention will appear from the following description and the appended claims.

By the expression "carbonate-containing alkaline solution", as used herein, is meant an aqueous solution containing carbonate ions ($CO_3^{2-}$). Preferably, this solution is an alkali metal carbonate solution, such as a solution of sodium carbonate, potassium carbonate or lithium carbonate. Sodium carbonate is especially preferred, being as it is easily available as well as fairly inexpensive. The carbonate concentration of the solution is not critical, but suitably is about 0.1–3 M with respect to carbonate, preferably about 1–2.5 M, and most preferred about 2 M.

According to the invention, it is important that the carbonate-containing alkaline solution has a pH of at least about 9. pH values below about 9 result in unsatisfactory absorption of hydrogen sulphide, and there is even a risk that hydrogen sulphide already absorbed be released from the solution. However, the pH of the solution should not be too high, since this would have an unfavourable effect on the absorption of hydrogen sulphide as compared with the absorption of carbon dioxide. Thus, the pH of the solution should not exceed about 12 in order that the absorption of carbon dioxide should not be too considerable. Preferably, the pH of the solution is in the range of about 10.0–11.5, especially in the range of about 10.0–11.0, and most preferred in the range of about 10.2–10.8. If the pH of the solution is adjusted within this last narrow range, optimum separation of hydrogen sulphide is obtained.

As appears from the equilibrium reactions (5) and (6), hydrogen carbonate ions ($HCO_3^-$) are formed in the absorption of hydrogen sulphide and carbon dioxide. This means that the pH of the absorption solution decreases as the absorption of hydrogen sulphide and carbon dioxide proceeds. When the pH of the solution goes below about 9, the absorption of hydrogen sulphide becomes unsatisfactory, as indicated in the foregoing, and there is instead a risk that hydrogen sulphide already absorbed will be released from the solution. If this is to be avoided, the solution has to be regenerated, i.e. its pH be increased to above the lower permissible limit for a state of equilibrium between gaseous $H_2S$ and sulphide content of the liquid at the temperature and pH value at issue. However, the pH value must not be increased to above about 12, in which case the absorption of carbon dioxide would become predominant. As a result of the increase of the pH of the solution brought about by the addition of a hydroxide, such as an alkali metal hydroxide, e.g. NaOH, in accordance with the invention, the hydrogen carbonate ions formed are reconverted to carbonate ions according to the following equilibrium reaction.

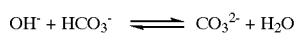

(7)

Being thus regenerated, the carbonate solution can absorb more hydrogen sulphide according to the reaction (5) above. Since the pH of the solution is adjusted by the addition of a hydroxide and maintained within the given range of about 9–12, preferably about 10.0–11.5, especially about 10.0–11.0, and most preferred about 10.2–10.8, the absorption of carbon dioxide is kept on such a low level as to be negligible.

As mentioned above, the carbonate-containing alkaline solution is regenerated by the addition of a hydroxide. Basically, use can be made of any hydroxide that does not have an adverse effect on the absorption of hydrogen sulphide and is capable of increasing the pH of the solution from the given lower limit of about 9 to the desired value, such as a value not exceeding about 12.0, preferably not exceeding about 11.5, and most preferred not exceeding about 10.8. According to the invention, use is preferably made of hydroxides of alkali metals or alkaline-earth metals, such as sodium hydroxide (NaOH), potassium hydroxide (KOH), lithium hydroxide (LiOH), calcium hydroxide (Ca$(OH)_2$) and magnesium hydroxide ($Mg(OH)_2$). Sodium hydroxide is the most preferred, for reasons of availability and cost.

The temperature of the liquid used in the absorption according to the invention is not particularly critical, and may vary within a wide range but preferably should be below about 80° C., since there is a risk that the absorption of hydrogen sulphide decreases at temperatures of about 80° C. and above. It is preferred that the temperature is in the range of from room temperature, i.e. about 20° C., to about 80° C., more preferably in the range of about 40–70° C., especially about 50–70° C., and most preferred about 60–70° C.

According to the invention, it has been found that the selectivity for hydrogen sulphide in the liquid absorption is optimised by carrying out the absorption in such a manner that the flow of gas and the flow of the absorbing liquid are countercurrent, and by having a turbulent flow of gas and a laminar flow of liquid. Furthermore, the separation of hydrogen sulphide is promoted if the volume of absorbing liquid is large compared to the volume of gas from which hydrogen sulphide is absorbed. Such a high ratio of liquid to gas is obtained by recycling the absorbing liquid which is contacted with the hydrogen-sulphide-containing gas.

Moreover, the contact between the hydrogen-sulphide-containing gas and the absorbing liquid (the carbonate-containing solution) involves several stages, preferably two or three stages, and most preferred three stages. Such multistage contact has the advantage of shortening the length of the individual stages, so that the pH of the carbonate-containing solution does not have time to fall below about 9 in the individual stages, while at the same time the sulphide content can be kept low in the uppermost stage. Preferably, each stage has such an extent or length that the pH of the solution at the end of the stage has fallen to about 10.0–10.2, the liquid being then drawn off to be regenerated by means of a hydroxide and then be recycled to the stage at issue.

For clarifying purposes, the invention will now be described with reference to the accompanying drawing, which shows a preferred embodiment of the apparatus according to the invention.

The inventive apparatus comprises a tower or container 1 having an inlet 2 for a gas 3 generated in black-liquor evaporation and containing hydrogen sulphide as well as carbon dioxide. At the opposite end of the apparatus, there is provided an outlet 4 for gas 5 from which hydrogen sulphide has been removed by liquid absorption. The contact between the hydrogen-sulphide-containing gas and the carbonate-containing solution involves three stages 6, 7 and 8. Each stage contains a packing 9, as hinted at in stage 6 in the drawing. To optimise the selectivity for hydrogen sulphide in the absorption, the packing 9 has such a shape as to generate a laminar flow of liquid through the stages 6, 7 and 8. According to the invention, it has been found that a packing in the form of corrugated plates is especially suitable for this purpose. The packing may, for instance, be made of plastic or metal.

The contact between the hydrogen-sulphide-absorbing carbonate-containing solution and the hydrogen-sulphide-containing gas is carried out in countercurrent fashion. To this end, each stage has means for supplying the carbonate-containing solution through the stage countercurrently to the gas, as well as means for recycling the solution across the stage. As shown in the drawing, these means are made up of pumps 10, 11 and 12 which, via conduits 13, 14 and 15, feed the carbonate-containing alkaline solution to the respective stages 6, 7 and 8, as well as conduits 16, 17 and 18 conducting the solution from the respective stages to collecting vessels 19, 20 and 21. From these collecting vessels, the solution is recycled across the stages through conduits 22, 23 and 24 which are connected to the pumps 10, 11 and 12, respectively. Fresh carbonate solution, preferably sodium carbonate solution, is fed to the last stage 6, as seen in the feed direction, through a conduit 25 from a supply (not shown) of sodium carbonate solution.

Instead of supplying fresh carbonate solution to the last stage, the carbonate solution can be generated in the last stage by supplying sodium hydroxide solution to this stage and allowing the hydroxide solution to absorb carbon dioxide from the gas, such that a carbonate-containing solution is obtained according to the reactions (3)–(4) above.

In order to adjust (increase) the pH of the absorption solution, a hydroxide, preferably a sodium hydroxide solution, may be supplied to the collecting vessels 19, 20 and 21 through conduits 26, 27 and 28, respectively, conducting alkali from a supply (not shown), which preferably is common all the conduits. The supply of sodium-hydroxide solution for adjusting the pH of the absorption solution is regulated on the basis of the measured pH values of the solutions in the collecting vessels 19, 20 and 21 (not shown).

As appears from the drawing, the different stages are furthermore interconnected by conduits 29 and 30 for feeding a partial flow of absorption solution from one stage to a preceding stage, i.e. from the stage 6 to the stage 7 as well as from the stage 7 to the stage 8.

Finally, an outlet conduit 31 is arranged for discharging sulphide-containing liquid from the collecting vessel 21 and the stage 8.

The invention will now be further elucidated with the aid of a non-restricting Example.

Example 1

A test was performed for the selective removal of hydrogen sulphide from a gas generated in black-liquor evaporation. Use was made of an apparatus of the type described above and shown in the accompanying drawing.

Absorption took place at atmospheric pressure, and the incoming gas had a temperature of about 60° C. and contained 1.13 mole % of hydrogen sulphide and 16.9 mole % of carbon dioxide. The gas was saturated with water vapour at the temperature at issue, which corresponded to about 18.7 mole % of water. The incoming gas flow was 38,280 $Nm^3/h$, giving the gas a velocity of about 3.1 m/s 35 in the absorption tower. The absorption tower had a height of 6.25 m, and the two first stages each had a height of 1.5 m, whereas the last stage, as seen in the feed direction of the gas, had a height of 1 m. Each stage was provided with a packing of the type Mellapack 500 from Sulzer. The diameter of the tower was 2.3 m.

Fresh absorption solution, consisting of 8.8 $m^3/h$ of 2 M sodium carbonate solution having a temperature of about 60° C., was supplied to the last stage in the tower along with recycled absorption solution, such that a total of about 50 $m^3/h$ of absorption solution was supplied to the last stage in the tower. The pH of the absorption solution supplied was about 11.0, which was reduced to about 10.2 during the passage of the solution through the stage owing to the absorption of hydrogen sulphide. After passing through the stage, the solution was supplied to a 1.5-$m^3$ collecting vessel where the solution was regenerated by the addition of a 2.5 M sodium hydroxide solution having a temperature of about 60° C., such that the pH of the solution was again raised to about 11.0. Then, the regenerated solution was recycled by means of a pump to the last stage in the absorption tower for renewed absorption of hydrogen sulphide.

About 11 $m^3/h$ of the absorption solution was drawn off from the collecting vessel of the last stage to the collecting vessel of the intermediate stage, whence about 50 $m^3/h$ of the absorption solution having a pH of about 11.0 was pumped, as in the previous stage, to the intermediate stage, whence the absorption solution was drawn off at a pH of about 10.2 to be recycled to the collecting vessel. In the collecting vessel, the solution was regenerated by the addition of a 2.5 M sodium hydroxide solution having a temperature of about 60° C., as in the previous stage.

From the collecting vessel of the intermediate stage, about 13.5 $m^3/h$ of the absorption solution was drawn off to the collecting vessel of the first (lowermost) stage, whence 50 $m^3/h$ of the absorption solution having a pH of about 11.0 was pumped to the first stage, as seen in the feed direction of the gas. After passing this stage and there absorbing hydrogen sulphide, the solution, now having a pH of about 10.2, was drawn off to the collecting vessel. In the collecting vessel, the solution was regenerated as in the previous stages by the addition of a 2.5 M sodium hydroxide solution having a temperature of about 60° C., such that the pH of the regenerated solution was about 11.0. All in all, about 8.6 $m^3/h$ of the 2.5 M sodium hydroxide solution was supplied to the collecting vessels of the three stages.

From the collecting vessel of the first (lowermost) stage, about 17.4 $m^3/h$ of the solution having a sulphide concentration of 1 mole/l was drawn off. The gas leaving the absorption tower contained 0.113 mole % of hydrogen sulphide and 16.4 mole % of carbon dioxide. In this test, the degree of separation of hydrogen sulphide was about 90%, and the selectivity for hydrogen sulphide in the separation was about 67%.

By having a high sulphide content as well as a high content of alkali metal carbonate, preferably sodium carbonate, the solution having undergone absorption according to the invention is exceptionally well suited for the production of white liquor to be used in the manufacture of sulphate pulp. According to the invention, the solution leaving the absorption tower after the absorption of hydrogen sulphide has, as indicated in the foregoing, a sulphide content exceeding about 0.30 mole/l, preferably exceeding about 0.47 mole/l. Usually, the sulphide content is in the range of about 0.30–1.30 mole/l, preferably in the range of about 0.47–1.1 mole/l, and most preferred in the range of about 0.65–1.0 mole/l. As stated above, the carbonate content suitably is about 0.1–3 M, preferably about 1–2.5 M, and most preferred about M.

What is claimed is:

1. A process in black-liquor evaporation for the selective removal, by liquid absorption, of hydrogen sulphide from the generated gas containing hydrogen sulphide and carbon dioxide, which comprises:
   contacting the gas countercurrently with multiple stages of circulating carbonate-containing alkaline solutions;
   adjusting the pH in each stage during absorption to about 9–12 by the addition of a hydroxide; and
   absorbing the hydrogen sulphide in the solution in each stage as hydrogen sulphide ions and sulphide ions to a total sulphide content exceeding about 0.30 mole/l in the outgoing solution in contact with the incoming gas.

2. A process as set forth in claim 1, wherein the hydroxide is an alkali metal hydroxide.

3. A process as set forth in claim 1, wherein the pH is adjusted to about 10–11.5.

4. A process as set forth in claim 1, wherein the hydrogen sulphide is absorbed to a sulphide content of about 0.47–1.1 mole/l in the outgoing solution.

5. A process as set forth in claim 1, wherein the carbonate-containing alkaline solutions have a carbonate content of about 0.1–3 M.

6. A process as set forth in claim 1, wherein the gas is contacted with a sodium carbonate solution.

7. A process as set forth in claim 1, wherein the gas is contacted with the solution in three stages.

8. A process as set forth in claim 1, wherein the gas and the solution are contacted under conditions of laminar liquid flow and turbulent gas flow.

9. An apparatus for use in black-liquor evaporation for the selective removal, by liquid absorption, of hydrogen sulphide from the generated gas containing hydrogen sulphide and carbon dioxide, wherein the apparatus comprises:

a container having a gas inlet and a gas outlet, the container containing a packing arranged in a number of successive stages including a last stage with respect to the feed direction of the gas;

means for supplying a carbonate-containing solution to the last stage;

means for supplying the carbonate-containing solution through each stage countercurrently to the gas;

means for recycling the solution across each stage;

conduits arranged between the stages for supplying a partial flow of the solution from one stage to a preceding stage with respect to the feed direction of the gas;

means for supplying a hydroxide to the carbonate-containing solution in order to adjust the pH of the solution in each stage to about 9–12; and an outlet conduit from the first stare with respect to the feed direction of the gas for discharging liquid containing hydrogen sulphide absorbed as hydrogen sulphide ions and sulphide ions in a total sulphide content exceeding about 0.30 mole/l.

10. An apparatus as set forth in claim 9, wherein the number of successive stages is three, and wherein the packing is in the form of corrugated plates.

11. A process as set forth in claim 2, wherein the alkali metal hydroxide is sodium hydroxide.

* * * * *

UNITED STATES PATENT AND TRADEMARK OFFICE
CERTIFICATE OF CORRECTION

PATENT NO.   : 6,306,357 B1
DATED        : October 23, 2001
INVENTOR(S)  : Simonson et al.

It is certified that error appears in the above-identified patent and that said Letters Patent is hereby corrected as shown below:

<u>Title page,</u>
Insert -- [*] Notice:   Under 35 U.S.C. 154(b), the term of this patent shall be extended for 0 days. --.

Signed and Sealed this

Eighth Day of April, 2003

JAMES E. ROGAN
*Director of the United States Patent and Trademark Office*